(12) United States Patent
Abbaspour-Tamijani

(10) Patent No.: US 9,170,348 B2
(45) Date of Patent: Oct. 27, 2015

(54) LENS-LIKE BEAM-FORMING NETWORKS FOR CIRCULAR ARRAYS AND THEIR CIRCUIT IMPLEMENTATION

(76) Inventor: Abbas Abbaspour-Tamijani, Los Angeles, CA (US)

( * ) Notice: Subject to any disclaimer, the term of this patent is extended or adjusted under 35 U.S.C. 154(b) by 192 days.

(21) Appl. No.: 13/533,468

(22) Filed: Jun. 26, 2012

(65) Prior Publication Data

US 2012/0327516 A1   Dec. 27, 2012

Related U.S. Application Data

(60) Provisional application No. 61/501,744, filed on Jun. 27, 2011.

(51) Int. Cl.
| | | |
|---|---|---|
| G02B 27/10 | (2006.01) | |
| G02B 1/00 | (2006.01) | |
| G02B 27/09 | (2006.01) | |
| G02B 27/12 | (2006.01) | |
| H01Q 3/24 | (2006.01) | |
| H01Q 21/00 | (2006.01) | |
| H01Q 21/20 | (2006.01) | |

(52) U.S. Cl.
CPC .......... *G02B 1/002* (2013.01); *G02B 27/0955* (2013.01); *G02B 27/123* (2013.01); *H01Q 3/242* (2013.01); *H01Q 21/0031* (2013.01); *H01Q 21/205* (2013.01)

(58) Field of Classification Search
CPC .. G02B 1/002; G02B 27/0955; G02B 27/123; H01Q 21/0031; H01Q 21/205; H01Q 3/242
USPC ........................................................ 359/619
See application file for complete search history.

(56) References Cited

U.S. PATENT DOCUMENTS

| | | | | |
|---|---|---|---|---|
| 3,852,761 | A * | 12/1974 | Bogner ......................... 343/754 |
| 5,734,349 | A * | 3/1998 | Lenormand et al. .......... 342/373 |
| 7,541,894 | B2 * | 6/2009 | Miyaguchi et al. ........... 333/164 |
| 2002/0077152 | A1* | 6/2002 | Johnson et al. ............... 455/562 |
| 2007/0285314 | A1* | 12/2007 | Mortazawi et al. ........... 342/375 |

* cited by examiner

*Primary Examiner* — Scott J Sugarman
*Assistant Examiner* — Vipin Patel

(57) ABSTRACT

A beamforming apparatus comprising a number of beam ports $N_B$ arranged in a circular array, the circular array having a radius a, an annular shaped lens encircling the number of beam ports $N_B$, the annular shaped lens having an inner radius a, an outer radius b, and an inhomogeneous refractive index n(r), and a number of array ports $N_A$ coupled to the outer rim of the annular shaped lens.

16 Claims, 16 Drawing Sheets

LENS-LIKE BEAM-FORMING NETWORKS FOR CIRCULAR ARRAYS AND THEIR CIRCUIT IMPLEMENTATION

RELATED DOCUMENTS

The present application claims benefit under 35 U.S.C. §119(e) of U.S. Provisional Application No. 61/501,744 filed Jun. 27, 2011. This application is incorporated herein by reference in its entirety.

BACKGROUND

The present disclosure is related to the general field of antennas design, and particularly pertains to the subjects of electronic beam-steering, feed network synthesis, and electromagnetic metamaterials. The present application describes a beamforming apparatus that may be used for feeding circular ring arrays with 360° scan coverage, its basic design method, and its implementation as an electrical network.

Beam steerable antennas with 360° scan coverage have long been a subject of interest to the antenna community and have been extensively studied for the purpose of implementing radars and direction finders (DF). 360° beam-steering also has many potential applications in wireless communication systems, for example when implementing base station antennas for cellular communication or for wireless local area networks (WLAN).

360° beam steering can be implemented using circular ring antenna arrays, which in this case refers to an array of identical antenna elements arranged on a circle such that each element has an outward directed beam in a radial direction defined by the geometric center of the ring and the phase center of the element. In one implementation, a steerable beam is obtained by switching the electric signal between the different antenna elements, or, in the case of direction finders, by directly reading the received signal at the output of individual elements. In this case, each element corresponds to a predefined radiation pattern and beam.

Alternatively, the beam can be synthesized by combing the radiations (or received signals) from multiple array elements. In this case a large portion of the array elements contribute to the transmitted or received signal at any given time. Distributing the transmitted power between the radiating elements and combining the received signals is achieved by a multi-port electrical network called a "beam-forming network", or BFN.

BFN is used to realize the desired transfer functions between the antenna elements and transmit/receive electronics. The ports at which the BFN couples to antennas are called "array ports". The ports at which the BFN is coupled to the electronics are called beam port(s). BFN can be fully passive and made up of fixed components, in which case it will be used to generate a number of pre-determined radiation patterns (multi-beam antenna), or it may be active and include control devices that are used to set the amplitude and phase of excitation for individual antenna elements on command, thereby providing an electronically control radiation pattern and beam angle (phased array). In the contemporary language of antenna engineering, the term beam-forming network usually refers to the first configuration and is used in the context of multi-beam antennas. The same meaning of the term is intended throughout this writing.

There are a number of designs for implementing the BFN for linear antenna arrays (arrays in which the antenna elements are arranged on a straight line), including "Butler matrix" (J. L. Butler and others "Beam Forming Matrix Simplified Design of Electronically Scanned Antennas," Electronic Design, pp 170-173, 1961) and "Rotman Lens" (W. Rotman and Others, "Wide-Angle Microwave Lens for Line Source Applications," *IEEE Transactions on Antennas and Propagation*, pp. 623-632, 1963). In these types of designs, the BFN can be implemented in the form of a rectangular network, where the array ports and beam ports are built on two opposite sides of the rectangle. The phase delay relationships between the array ports and beams port are such that exciting the BFN from any given beam port creates the phase gradient necessary for producing a beam in one of the desired directions. The power entering BFN from each beam port distributes (nearly) equally between all antenna elements.

It is well understood that the most suitable geometry for the BFN in the case of circular ring arrays with 360° scan is a circular geometry. In this case, the beamforming network plays two roles: 1) it produces the desired phase relationship among array ports and 2) it concentrates the power entering from each beam port predominantly among the antenna elements facing the direction of the desired output beam, that is, those whose maximum radiation occurs within ±90° of the output beam angle. We refer to these elements as the "facing elements". Designing a BFN that accomplishes both of these tasks is difficult.

The design of circular BFN's has been addressed in the U.S. Pat. Nos. 3,392,394, 5,274,389, and 3,754,270. All of these works rely on two-dimensional (2D) Luneberg lenses (G. D. M. Peeler and Others, "A Two-Dimensional Microwave Luneberg Lens," IRE Trans. Antennas and Propagation, pp. 12-23, 1953) or homogeneous approximation thereof to accomplish the objectives of concentrating the power on the facing array ports and synthesizing the required phase delays. However, due the fact that the radiating aperture and focal point of the Luneberg lens both lie on its outer surface, in all of these designs the ports are defined on the rim of the lens double as both beam ports and array ports. Each of these designs proposes a way for separating the beam ports and array ports, but the resulting assembly is invariably cumbersome and for most applications undesirable.

The beamformer proposed in the U.S. Pat. No. 3,392,394 is implemented as a pair identical 2D Luneberg lenses each having an N number ports that are stacked so that their ports line up on top of each other. Each of the N resulting double port stacks can be converted to a beam port and an array port by introducing a quadrature phase hybrid coupler. The drawback of this design is that it requires two Luneberg lenses and N hybrid couplers that can occupy considerable space and introduce at least some loss into the system.

A simpler version of the above design has been proposed in the U.S. Pat. No. 5,274,389 for a direction finder, where one of the Luneberg lenses is removed and the idle ports of the hybrid couplers is terminated by matched resistors. This approach results in 6 dB loss in the signal that is unacceptable in many applications.

The U.S. Pat. No. 3,754,270 proposes another beamformer that is based on a single N-port lens coupled to N isolators. If the isolators are coupled to the lens ports at their first and are right handed (allowing 1-2-3 rotation), in the transmit mode their second ports can act as the array ports and their third ports as the beam ports. The presence of the isolators adds significant complexity to the design and is particularly problematic at higher frequencies. Also, for the same configuration to work on the receive mode, the sense of rotation in the isolators must be reversed (3-2-1 rotation). This requires the use electronically controllable isolators (such as Farady rotation isolators (D. M. Pozar, *Microwave Engineering*, 3rd Edition: Wiley, 2004)) that further complicates the implementation.

From these examples it is clear that the lack of separation between the array ports and beam produces undesirable results. Introducing additional building blocks to make this distinction leads to complex configurations that are often large, lossy, not realizable at high frequencies, and not suitable for miniaturization and integration.

SUMMARY

Therefore, it is a first object of this specification to provide a solution for beamforming in circular ring arrays with 360° coverage that can be implemented using simple electrical components and with compact dimensions and provides a natural separation between the beam ports and array ports. This beamforming apparatus: 1) directs the majority of the power transmitted from each beam port towards the antenna elements that effectively contribute to the radiation in the desired direction associated with that beam port, 2) ensures that the radiations from these elements have the proper phase relationship, and 3) whose implementation does not require any switches or lossy elements. A beamforming apparatus consisting of a nonhomogeneous annular lens device and a number of radially connected transmission line segments is proposed to address these features. We refer to this apparatus as the "Annular Lens Beam-Former" or ALBF.

A secondary object of this specification is to provide a method of determining the value of the refractive index of the annular lens as a function of the radius or n(r)—where r is the radius measured from the center of the lens—that accomplishes a first object of this specification. A design method based and formalism on geometrical optics is provided to achieve this objective.

Another object of this specification is to provide a method for implementing the annular lens of the secondary object as an electrical network of capacitors, inductors, and transmission line segments. A design method and implementation based on techniques commonly used in the field of metamaterials is introduced for deriving the circuit implementation.

Yet another object of this specification is to describe how the proposed ALBF can be used for the purpose of power combining.

An element of the proposed ALBF is a non-homogeneous annular lens, which is designed using principles of geometrical optics. In an example of this device, the annular lens is implemented using 2D electromagnetic metamaterials in the form of a constrained electrical network with an annular topology, where the beam ports and array ports are defined by the nodes lying on the inner and outer rims of the network, respectively. A signal launched from a beam port is primarily distributed to the array ports that are located on the same side of the ALBF (but on the outer rim), effectively exciting the portion of the circular ring array that makes the greatest contribution to the far field radiation in the direction of the beam. The annular lens also ensures that signals reaching these elements have the proper phase relationships used to synthesize a collimated output beam.

The annular topology of the ALBF physically separates the beam ports from the array ports and creates a natural isolation between the excited beam port and non-facing array ports, eliminating the need for hybrid couplers. Also the fact that annular lens is realized as an electrical network with well-defined lumped ports eliminates the need for large transitions and allows for very compact designs. The hollow space in the middle of ALBF provides a natural place for accommodating transceiver electronics and beam selection switches.

BRIEF DESCRIPTION OF THE DRAWINGS

The accompanying drawings illustrate various examples of the principles described herein and are a part of the specification. The illustrated examples are merely examples and do not limit the scope of the claims.

FIG. 5b shows the calculated electromagnetic rays inside the annular lens according to the example of FIG. 5a.

Throughout the drawings, identical reference numbers designate similar, but not necessarily identical, elements.

DETAILED DESCRIPTION

Figure 1:
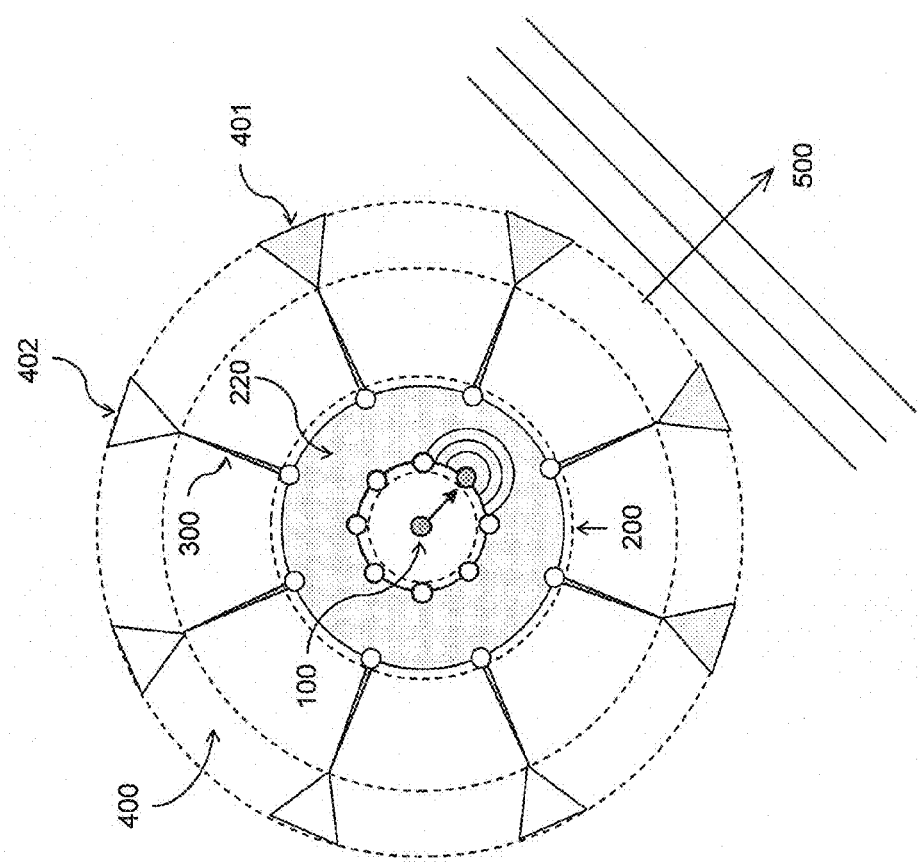
FIG. 1 is a diagram of an electronically steerable antenna based on an annular lens beamformer (ALBF) device according to one example of the principles described herein.

FIG. 1 shows a diagram of an electronically steerable antenna circular ring array based on an annular lens beamformer (ALBF) device [200] according to one example of the principles described herein. In this topology, ALBF is placed in between an N-element circular ring array [400] and the front-end electronic stage. An element of the ALBF is an annular lens like device [FIG. 2a, 220] that is responsible for synthesizing the proper phase and amplitude transfer functions for constructing the desired array factor (beamforming). Antenna elements [FIGS. 1 and 2, 400i, 401, 402] are coupled to this annular lens at $N_A$ equally spaced "array ports" [FIG. 2a, 231, 232], defined on the outer rim of the annular lens. The connection between the antennas and the lens is generally through $N_A$ equal-length transmission line segments [300]. These transmission line segments do not alter the relative amplitudes and phases of ALBF transfer functions, but provide an additional degree of freedom that allows the diameter of the annular lens [220] to be chosen independently of the diameter of the array. The coupling between the ALBF and front-end electronics is through $N_B$ equally-spaced "beam ports" [FIG. 2a, 211,212] that are defined on the inner rim of the annular lens. In general, $N_A$ and $N_B$ can be different, but perfect rotational symmetry is attainable where $N_A=N_B$.

The annular lens beamformer is designed such that feeding from each beam port produces properly-phased excitations over the antenna elements facing the corresponding beam direction, that is, those antenna elements whose direction of peak directivity lies within ±90° of the output beam angle. We refer to the elements fulfilling this condition as the "facing elements" [401]. The rest of the elements are referred to as the "non-facing elements" [402]. Similarly, the array ports connected to the facing elements are referred to as the "facing array ports" [FIG. 2a, 231], and the array ports coupled to the non-facing elements are referred to as "non-facing array ports" [FIG. 2a, 232]. Considering that the direction of the beam is determined by the angle of the active beam port [FIG. 2a, 211], facing and non-facing elements and array ports can be defined relevant to each beam port. The power radiated by the non-facing elements is reduced due to the way that the wave propagates inside the annular lens, and the residual radiations from these elements tend to cancel out in the far field as a result of destructive interference. A steerable or multi-beam radiation pattern may be produced using an RF switch [FIG. 1, 100] to select the desired beam port.

Figure 2A:
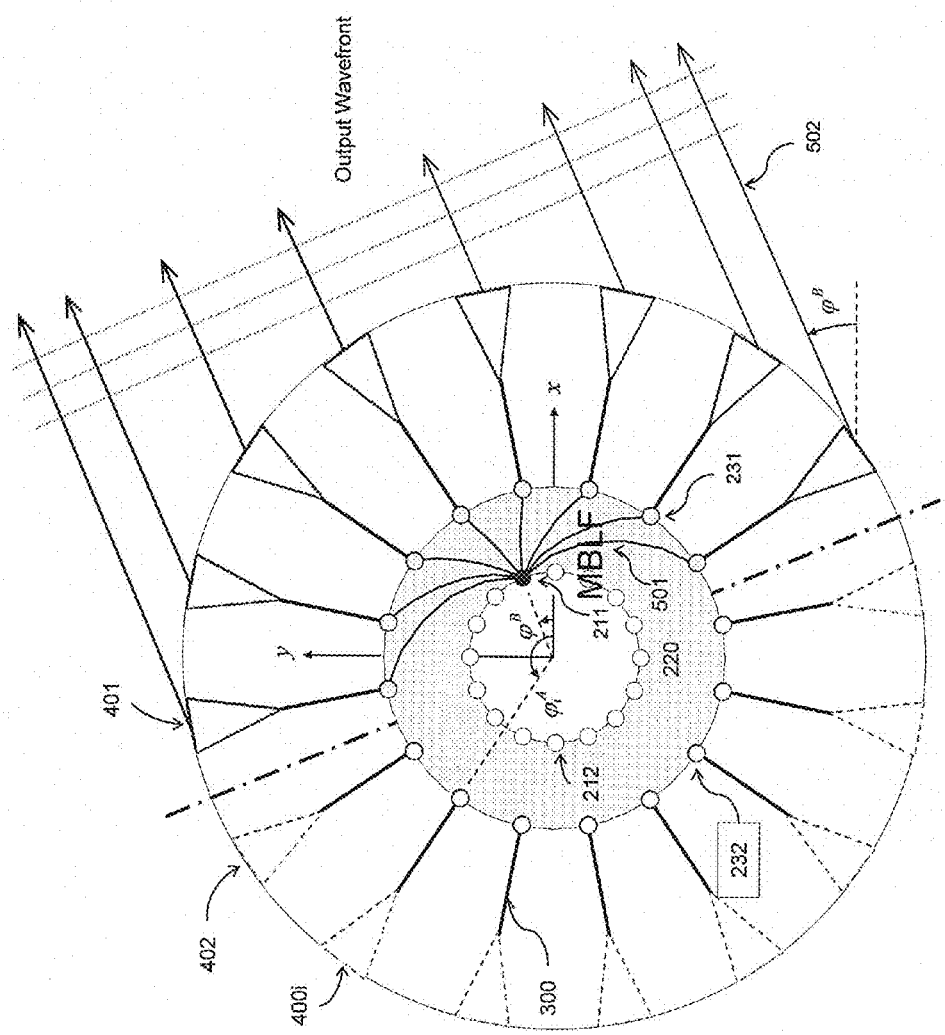
FIG. 2a visualizes the operation of an example multi-beam antenna composed of a circular ring array of outward looking antenna elements and an annular lens beamformer apparatus according to one aspect of the present specification. Facing [401] and non-facing [402] elements and electromagnetic rays propagating inside the annular lens [501] and surrounding medium [502] are shown for operation in the transmit mode with an output beam angle of $\phi^b$. The direction of the coordinate system axes and definitions of various angles are also shown.
Figure 2B:
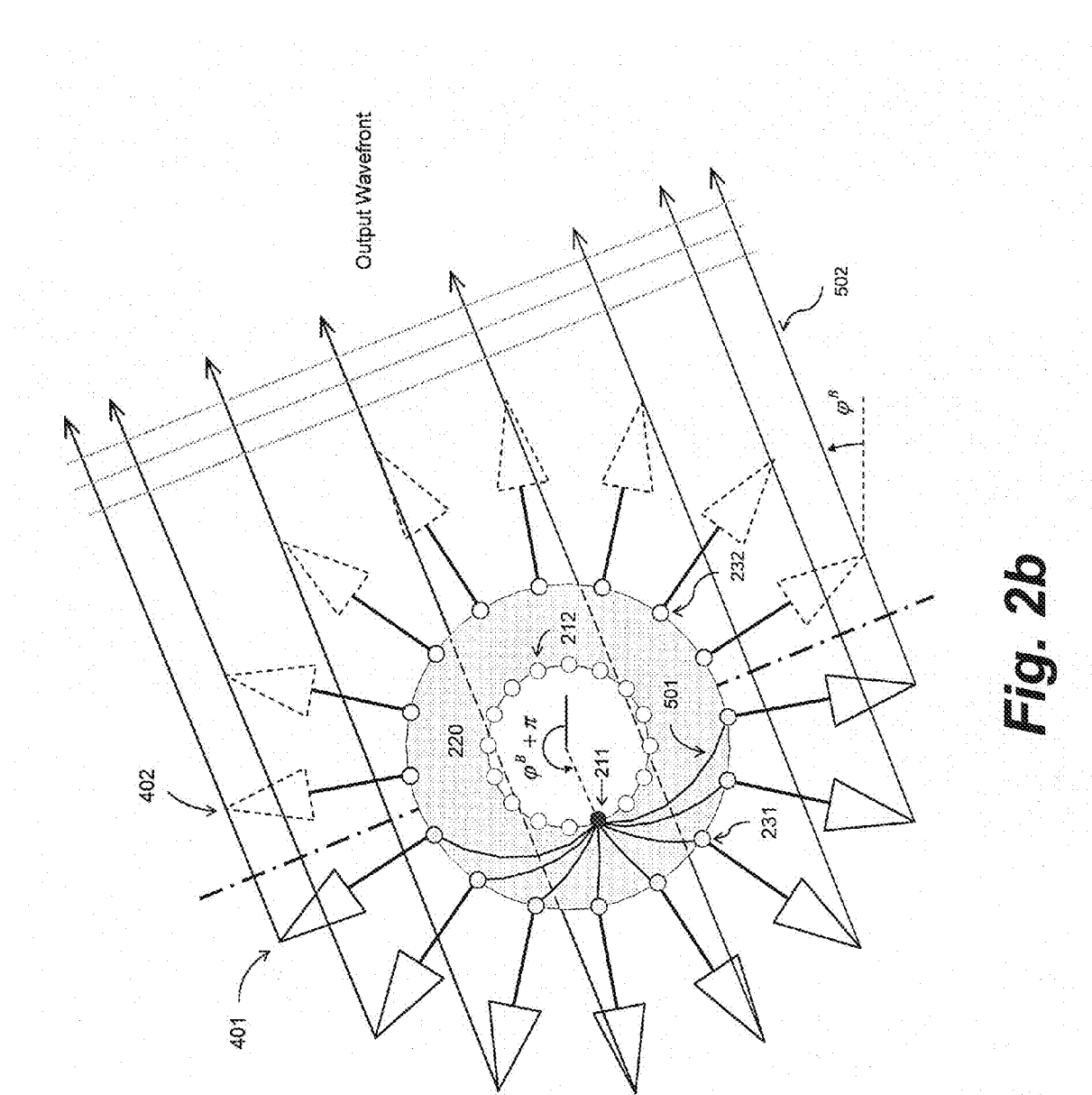
FIG. 2b visualizes the operation of an example multi-beam antenna composed of a circular ring array of inward looking antenna elements and an annular lens beamformer apparatus according to another aspect of the present specification.

In the configuration of FIG. 1 and FIG. 2a routing the signal to the beam port located at angle $\phi^B$ results in an output beam in the same direction [FIG. 2a, 502]. FIG. 2b shows an alternative topology in which the antenna elements have a backward radiation pattern. In this configuration, to generate an output beam at angle $\phi^B$ the antenna is excited from the beam port located at $\phi^B+\pi$.

The refractive index of the annular lens is tailored so that a cylindrical wave emanating from any of the beam ports excites the $N_A/2$ facing ports with the proper phase. In the present application, "proper phase" is meant to be understood as the phase needed for driving a semicircular array of elements with radius c to produce a free-space beam at the angle $\phi^B$, where $\phi^B$ is as denoted in FIGS. 2a and 2b. The procedure for finding the appropriate refractive index function n(r) involves geometrical optics calculations and numerical optimizations. Due to the rotational symmetry, the problem is solved for one value of $\phi^B$, most conveniently for $\phi^B=0$.

Figure 3:
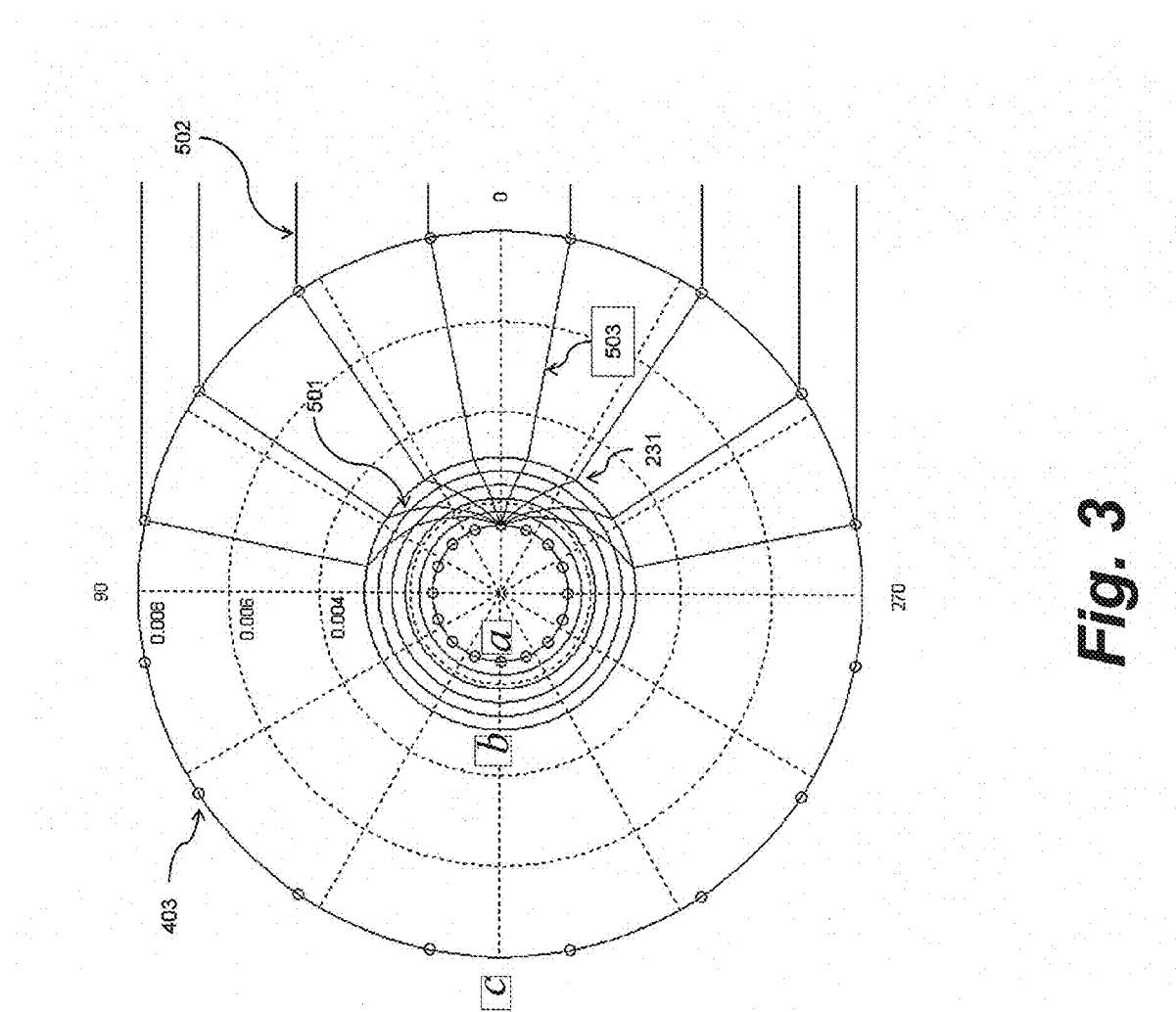
FIG. 3 is a diagram showing the electromagnetic rays between the beam port 1 and the facing array ports in an annular lens beamformer and their propagation in the surrounding medium according to one example of the principles described herein. For a properly designed lens, the electromagnetic rays in the surrounding region will be parallel to each other.

The geometrical optics (GO) picture of the operating principle of the proposed beamforming apparatus is shown in FIG. 3. In this figure, the annular band occupying the region a≤r≤b represents the inhomogeneous annular lens. The point (r, $\phi$)=(a, 0) represents the excited beam port, and the facing array ports lie on the right half of the circle r=b. The points marked by small circular bullets on the ring r=c denote the phase centers of the antenna elements [403]. The region r>c represents the surrounding propagation medium with refractive index $n_0$ (for antennas operating in air or free space $n_0$=1). The bent lines connecting the beam port to each of the array ports [501] represent the optical paths (rays) inside the annular lens. The horizontal lines in the r>c region [502] represent the rays in the surrounding medium. The radial line connecting each array port to the corresponding antenna element in the b<r<c region [503] represents propagation through the transmission line interconnecting the array port to the antenna element.

Assuming that the inhomogeneous annular lens is made up of M narrow concentric rings (layers) with homogeneous refractive index $n_m$, the electromagnetic rays emerging from the beam port propagate on straight paths inside each layer, but are refracted at the boundaries between adjacent layers according to the Snell's law of refraction. The optical path length inside each homogeneous region is defined as the product of the geometrical length of the ray in that region and the refractive index of the material filling that region. For the transmission line segments the refractive index can be defined as ratio of the speed of light ($3\times10^8$ m/s) to the phase velocity of the line, but in general the optical length through the transmission line segments can be ignored, because it is the same for all array ports. The values of the inner and outer lens radii, a and b respectively, and the array radius c are chosen based on practical considerations and array requirements. n(r) (or the discrete values $n_1$ through $n_M$) is found such that all of the output rays reach a faraway point (r→∞) with the same optical path length. It can be shown that this is equivalent to the condition that the electromagnetic rays in the surrounding medium remain parallel to the x axis.

Figure 4:
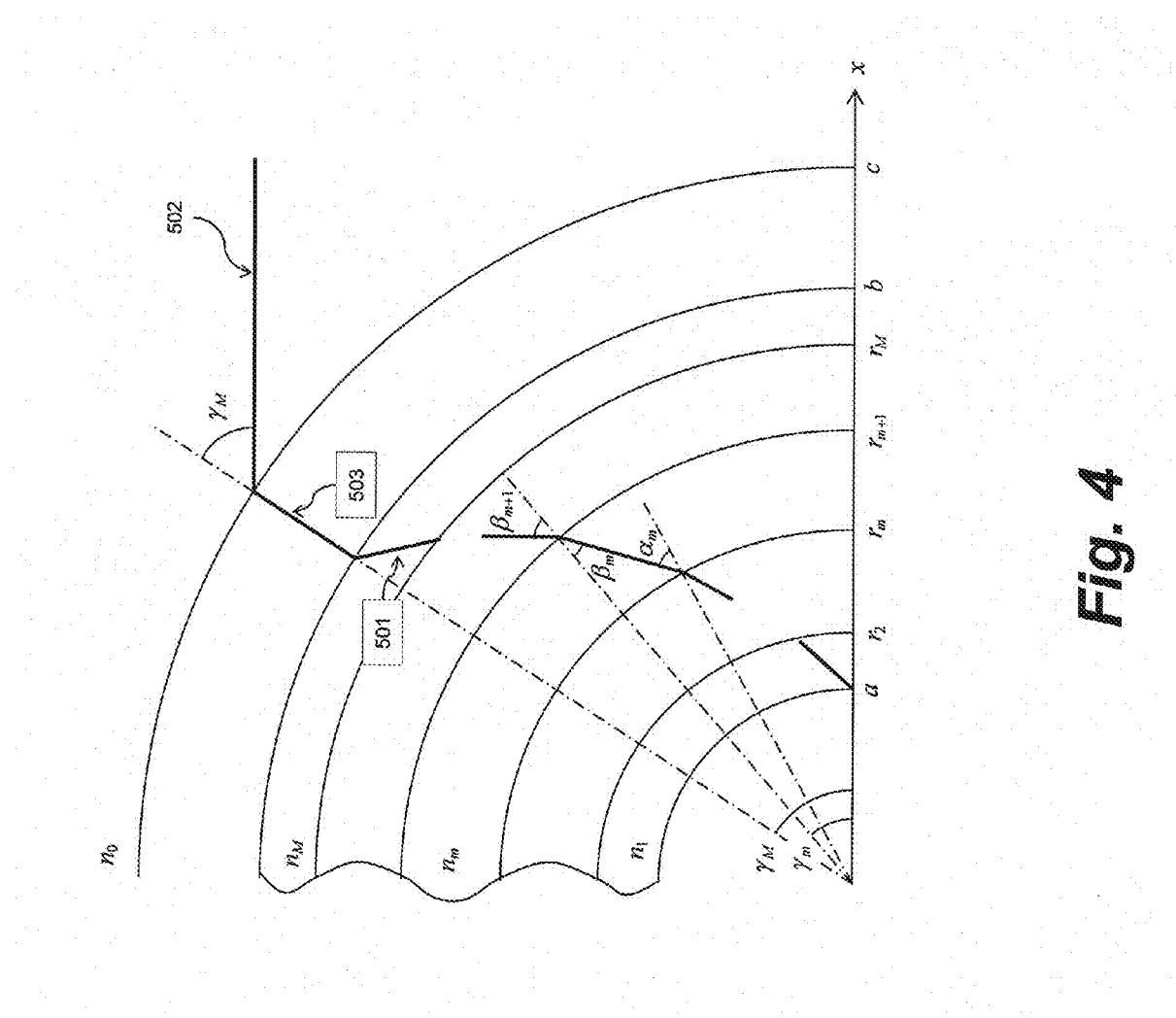
FIG. 4 shows the geometrical optics setup for calculating the electromagnetic rays and designing the annular lens and defined various geometric parameters for a ray emanating from the first beam port located at r=a and $\phi$=0.

FIG. 4 shows a detailed geometrical setup for calculating the optical path lengths and finding n(r). In this setup, the m'th homogeneous ring is defined by an inner radius $r_m$, outer radius $r_{m+1}$ and has the refractive index $n_m$ (obviously $r_1$=a, $r_{M+1}$=b). The point from which the ray exists layer m is denoted by $(r_{m+1}, \gamma_m)$. The angle defined by the ray and the radial direction at its point of entry to the layer is denoted by $\alpha_m$ and angle between the ray and the radial direction at its point of exit from the layer is denoted by $\beta_m$. The following relationships exist between these parameters:

$$\frac{\sin\beta_m}{r_m} = \frac{\sin\alpha_m}{r_{m+1}}; m = 1, \ldots, M \quad (1)$$

$$n_m \sin\beta_m = n_{m+1}\sin\alpha_{m+1}; m = 1, \ldots, M-1 \quad (2)$$

$$\theta_m = \sum_{m'=1}^{m}(\alpha_{m'} - \beta_{m'}); m = 1, \ldots, M \quad (3)$$

In order for the ray to enter the surrounding medium in parallel with the x axis, one must have:

$$n_M \sin\beta_M = -\frac{c}{b}n_0 \sin\gamma_M \quad (4)$$

If this condition is satisfied, we will find:

$$\begin{cases} \sin\alpha_m = -\frac{n_0}{n_m}\frac{c}{r_m}\sin\gamma_M \\ \sin\beta_m = -\frac{n_0}{n_m}\frac{c}{r_{m+1}}\sin\gamma_M \end{cases}; m = 1, \ldots, M \quad (5)$$

and:

$$\gamma_M = \sum_{m=1}^{M}\left[\sin^{-1}\left(-\frac{n_0}{n_m}\frac{c}{r_m}\sin\gamma_M\right) - \sin^{-1}\left(-\frac{n_0}{n_m}\frac{c}{r_{m+1}}\sin\gamma_M\right)\right] \quad (6)$$

Theoretically, (6) must hold for all values of $\gamma_M$ in the $[-\pi/2, \pi/2]$ interval or thanks to its symmetry for $[0, \pi/2]$. However, due to the finite number of rings in the array this condition cannot be met perfectly for the entirety of this interval.

A first method of designing the annular lens is, therefore, to enforce (6) for M values of $\gamma_M$, preferably chosen as $\phi_1^A$, $\phi_2^A, \ldots, \phi_M^A$, the angles of the M array ports in the upper right quadrant of the ALBF closest to the x axis, and solve the resulting system of nonlinear equations for $n_1$ through $n_M$.

For a ray exiting at angle $\gamma_M$ the optical length can be calculated as:

$$L(\gamma_M) = \sum_{m=1}^{M} n_m r_m \frac{\sin(\alpha_m - \beta_m)}{\sin\beta_m} = \sum_{m=1}^{M} \frac{n_m^2 r_m r_{m+1}}{n_0 c} \sin\left[\sin^{-1}\left(\frac{n_0 c}{n_m r_m}\sin\gamma_M\right) - \sin^{-1}\left(\frac{n_0 c}{n_m r_{m+1}}\sin\gamma_M\right)\right] \quad (7)$$

The phase of the signal reaching an array port at angle $\phi_i^A$ can be calculate from the optical path length for $L(\phi_i^A)$. Assuming the excited ports all have the same amplitude, one can use this to calculate the output array factor as:

$$AF(\theta, \varphi) = \sum_i \exp[-jk_0 L(\varphi_i^A) + jk_0 n_0 c \sin\theta\cos(\varphi - \varphi_i^A)] \quad (8)$$

where $\theta$ and $\phi$ are the polar angles in the direction of observation, $k_0$ is the free space wave number at the design frequency, and the summation is over the $N_A/2$ facing array ports. A second method of designing the lens is, therefore, to find the refractive indexes $n_1$ through $n_M$ that maximize the magnitude of $|AF(\pi/2,0)|$. This can be set up and solved as an optimization problem using any of the variety of known non-linear optimization techniques. Under ideal circumstances, the optimal value of $|AF(\pi/2,0)|$ approaches $N_A/2$.

Figure 5A:
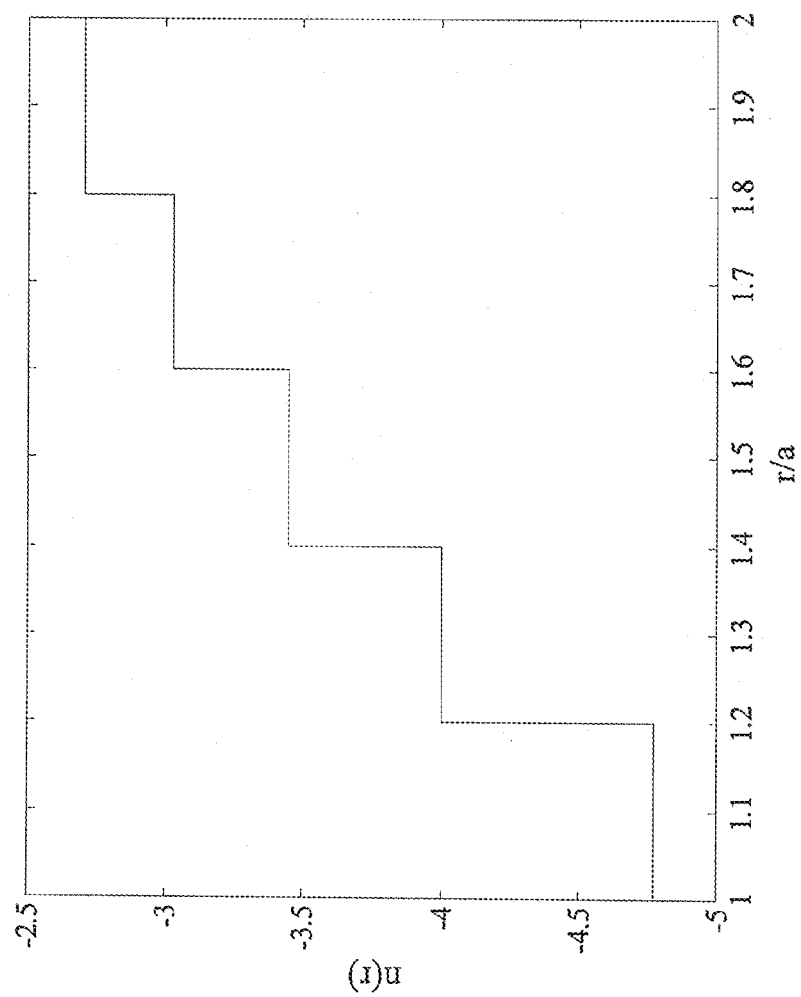
FIG. 5a. shows the calculated values refractive index for a multi-ring annular lens according to one example of the principles described herein.
Figure 5B:
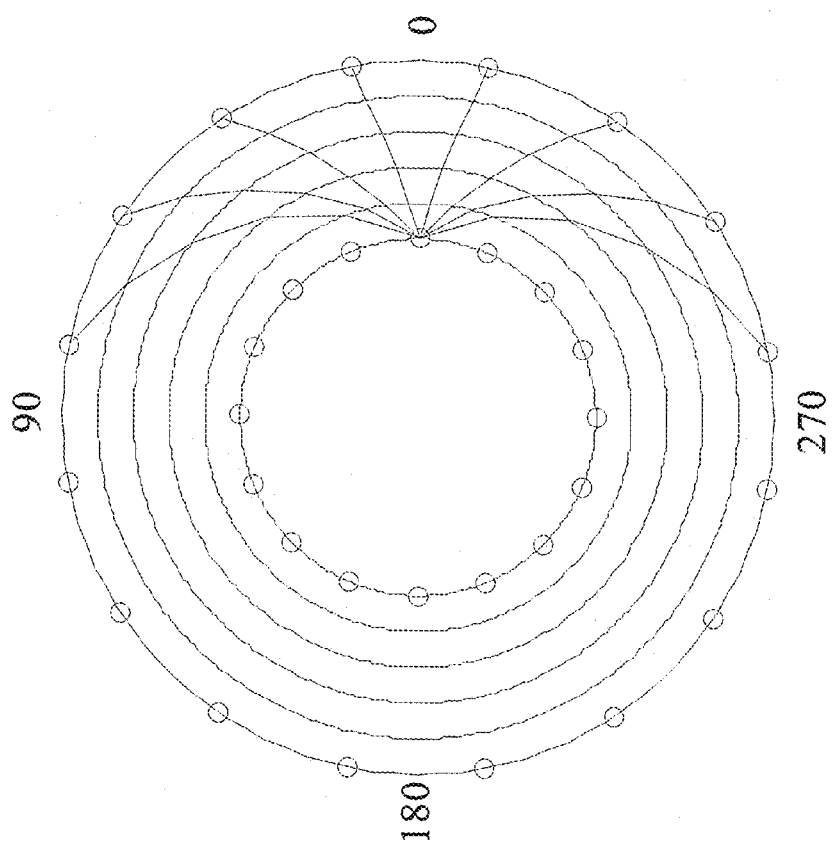
Figure 6:
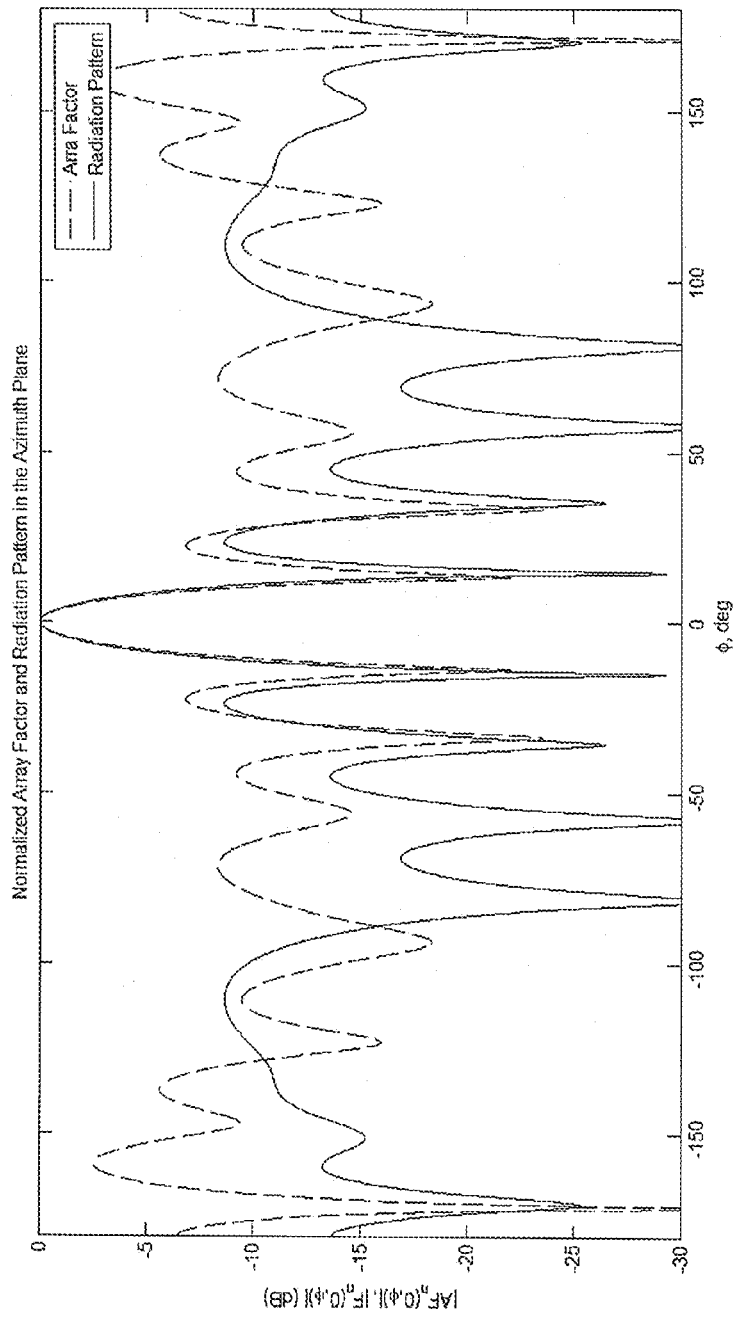
FIG. 6 shows the array factor and radiation pattern calculated for the semicircular ring array of the elements facing $\phi$=0 direction and based on the path lengths calculated for an example annular lens.

The calculated value of n(r) for a 5-ring 16-output ALBF for a certain choice of a, b, and c is shown in FIG. 5a. In this example the lens was divided into 5 equal width rings and the second method described above was used to find the values of n. Computed electromagnetic rays are shown in FIG. 5b. FIG. 6 shows the normalized array factor of the 32-element ring array when driven from the port at $\phi=0$. The overall radiation pattern calculated by assuming a cardioid element pattern of $\cos^2(\phi/2 - \phi_i^A/2)$ for the element located at (c, $\phi_i^A$) is also shown.

As seen from this example, the refractive index n(r) is negative. This is indeed always true if the ALBF is to be used with forward radiating antenna elements (configuration FIG. 2a), and can be explained by the fact that the array ports fed the elements that are father from the observation point are fed corresponds to the rays with greater geometrical length inside the annular lens. Therefore, we refer to this lens as the negative index ALBF, or simply "N-ALBF". Negative refractive index is not observed in natural materials at microwave frequencies, but it can be realized in narrow bandwidths using metamaterials.

If the radiating elements in the circular array have a backward pointing radiation pattern, as in the configuration of FIG. 2b, a similar process can be used to derive an lens beamformer design that when excited from an electronic port located at angle $\phi_i$ produces a beam in the direction $\phi_i + \pi$. According to the second design method described above, this requires $|AF|$ of (8) to be maximized for $(\theta, \phi) = (\pi/2, \pi)$. It can be observed that the values of n(r) in this case will be positive and equal to the absolute value of those found for the N-ALBF. This type of beamformer, which we refer to as the positive-index ALBF or simply "P-ALBF", can be realized using natural materials as well as low-pass artificial dielectrics and positive-index metamaterials and therefore is conducive to wideband true-time-delay type implementations. In practice, to avoid blockage and cross talk between elements, P-ALBF may be used with antenna elements with backward-tilted radiation pattern rather than those with backward in-plane beams. Such an assembly will be suitable for generating a scanning beam above or below—but not in—the ALBF plane. Consequently, the array factor is optimized for $(\theta, \phi) = (\theta_0, \pi)$ where $\theta_0$ is the actual elevation angle of the desired beam. It can be shown that this is equivalent to replacing c with $-c \cdot \sin\theta_0$ in equations (4)-(8).

Although it may be possible to implement the annular lens separately and couple it to the beam ports and array ports through properly designed tapered transitions, in one example of ALBF, the annular lens is implemented as an electrical network of inductors, capacitors, and transmission line segments. In a network implementation of this kind, beam ports and array ports can be directly defined between the properly chosen terminals of the network, hence eliminating the need for transitions. This presents an advantage over formerly introduced lens-based beamformers, and allows for unprecedented levels of miniaturization and integration.

A network implementation of ALBF can also be obtained by using a metamaterial approach. The metamaterial formulation in this case can be viewed as a wave-based network design approach that provides approximate recursive relationships between the nodal voltages and currents in every small region of the network by assuming that the local properties are similar to those of an infinite lattice. As these properties are easily translatable to an effective refractive index, a metamaterial outlook is ideal for deriving network implementations of the optically designed ALBF.

Figure 7A:
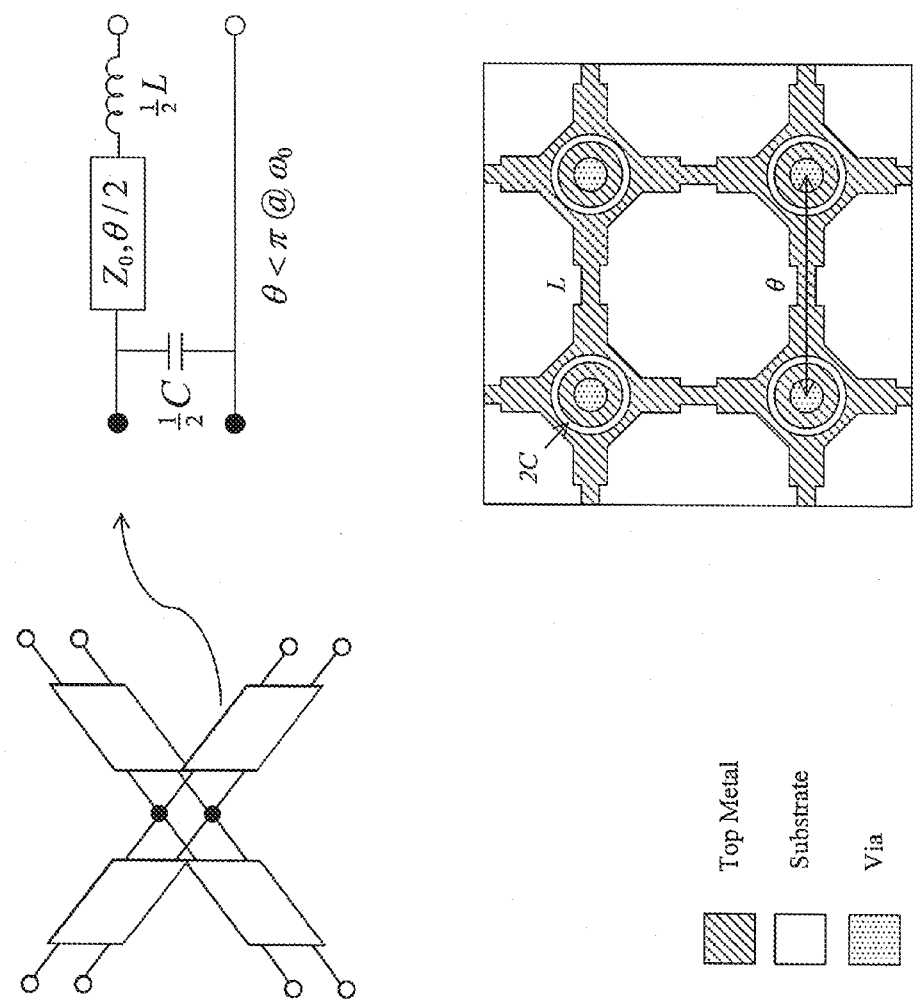
FIG. 7a is a diagram showing the circuit topography and microstrip implementation of a two-dimensional positive-index metamaterial according to one example of the principles described herein.
Figure 7B:
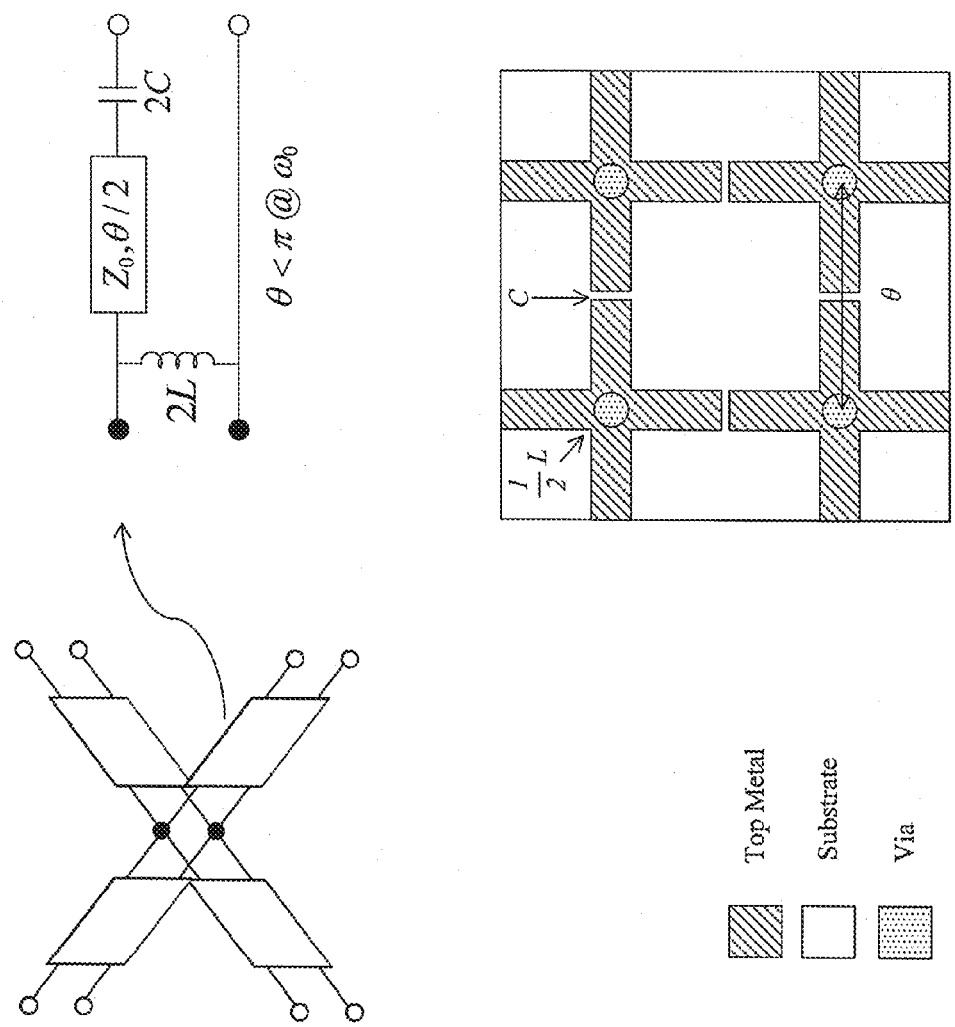
FIG. 7b is a diagram showing the circuit topography and microstrip implementation of a two-dimensional negative-index metamaterials according to one example of the principles described herein.

Turning now to FIGS. 7a and 7b, two diagrams are shown depicting example circuit topographies and two-dimensional (2D) microstrip implementations of a positive-index metamaterial and a negative-index metamaterial, respectively, according to one example of the principles described herein. Although these implementations are distributed and exhibit higher order resonances, the useful band of operation for topology 7a is from dc to nearly half of its Bragg frequency and for topology 7b is the lower portion of the fundamental pass-band. Generally speaking, positive index metamaterials can be implemented in both low-pass and band-pass topologies, while negative index metamaterials are invariably band-pass. In the microstrip implementation proposed in FIGS. 7a and 7b, capacitors and inductors are implemented in the form of planar capacitive gaps and vias, respectively. These choices of positive and negative metamaterial are merely examples that have been included for the purpose of illustration. In practice, other implementations may be needed to realize the desired values of capacitance and inductance. Other cell implementations and grid types (e.g. triangular or hexagonal) can also be used to implement the annular lens. The topology and design techniques for implementing 2D positive-index-of-refraction and negative-index metamaterials have been widely discussed in the literature known to those with the knowledge of the field (F. Capolino, *Metamaterials Handbook* CRC Press, 2009; C. Caloz and T. Itoh, *Electromagnetic metamaterials: transmission line theory and microwave applications: the engineering approach*. Hoboken, N.J.: John Wiley & Sons, 2006.).

Figure 8:
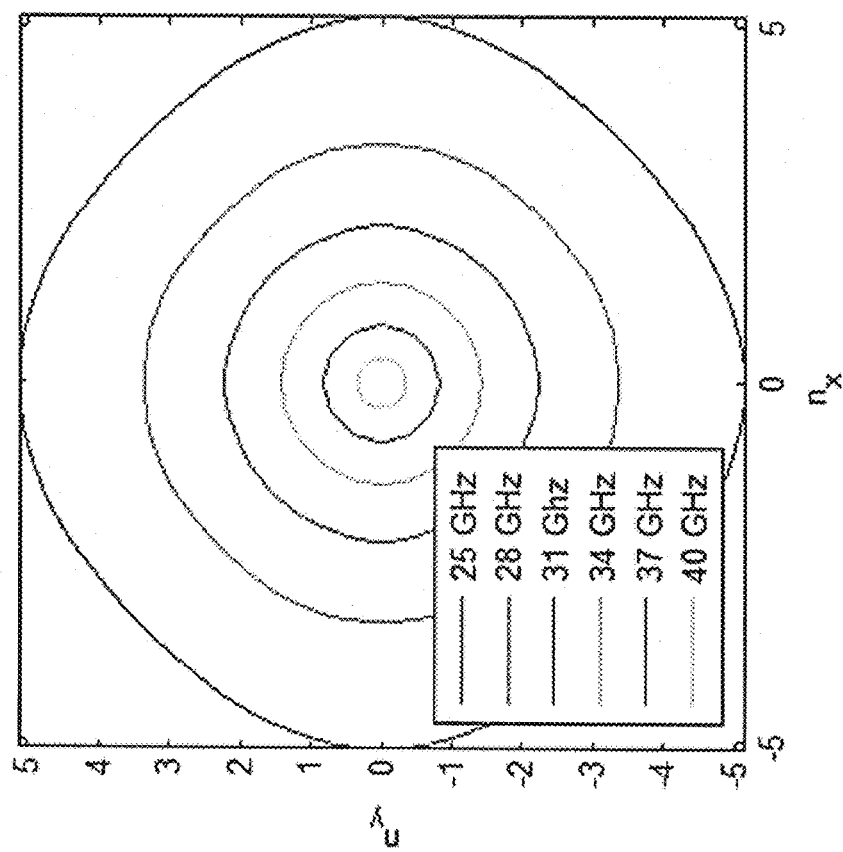
FIG. 8 is an iso-frequency contour plot in the $n_x$-$n_y$ plane for a negative-index metamaterial designed with the topology of FIG. 7b, according to one example of the principles described herein.

Dispersion relations for metamaterials in infinite lattice are obtained by solving the circuit equations for the each unit cell subject to proper periodic boundary conditions. These relationships give the per-unit-cell phase delays along each of the principal axes in terms of frequency and direction of propagation, which in the case of two-dimensional metamaterials, can be concisely presented by iso-frequency contour plots in the $k_x d$-$k_y d$ plane (where d is the grid constant). A useful presentation for the purposes of the present application is one of iso-frequency contour plots in the $n_x$-$n_y$ plane, where $n_x = k_x/k_0$ and $n_y = k_y/k_0$. A sample plot obtained for a negative-index metamaterial design with the topology of FIG. 7b is shown in FIG. 8, where the contours have been calculated for frequencies in the lower half of the lattice pass-band (below cell resonant frequency).

It has been stated that, if the unit cell dimensions are smaller than $\frac{1}{10}$ of the operating wavelength, metamaterials can be treated as natural materials in the sense that they can be cut into arbitrary shapes and yet maintain their infinite grid properties (C. Caloz and T. Itoh, *Electromagnetic metamaterials: transmission line theory and microwave applications: the engineering approach*. Hoboken, N.J.: John Wiley & Sons, 2006). This condition is commonly known as the "condition of homogeneity". Meeting this condition is difficult at upper microwave and millimeter-wave bands due to the manufacturing limitations. Fortunately, the condition of homogeneity can be dispensed with as long as: (1) the operation frequency is within the lowest pass-band of the metamaterial, (2) the sample geometry can be made up of complete unit cells, and (3) the termination conditions for the boundary elements are taken into account. One practical limitation in the case of annular lens is that the circular boundaries that define the homogeneous rings of the lens do not conform to common regular grids and pixelation errors can become significant for practical unit cell dimensions. This effect has been illustrated in FIG. 9a. Also, if the annular lens is implemented using a standard grid topology, ALBF will not be rotationally symmetric and the beam ports and array ports cannot be placed at equal angular intervals, which is necessary for maintaining a consistent radiation pattern and port impedance.

Figure 9B:
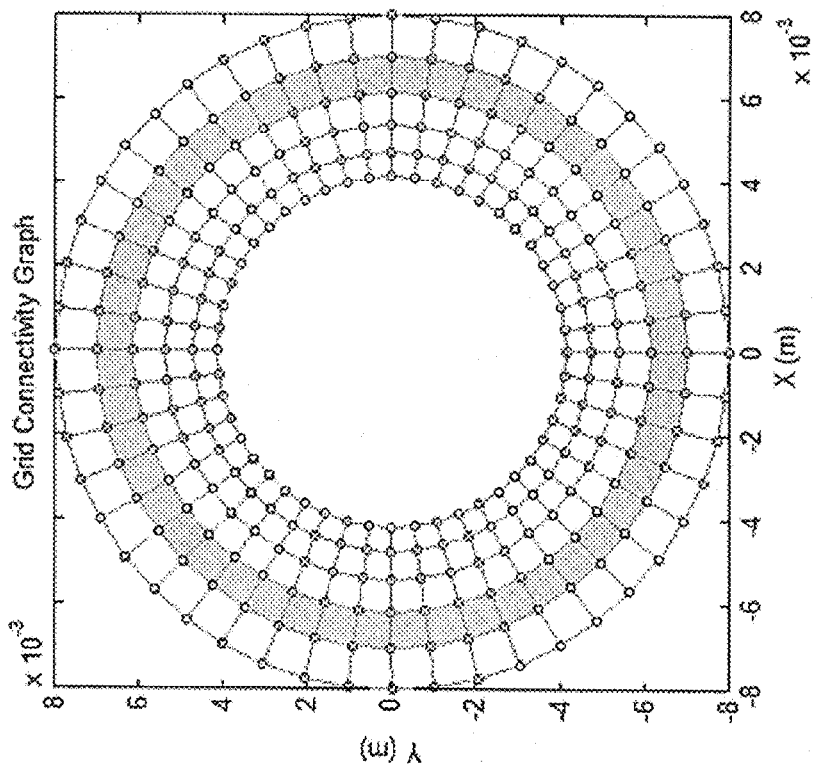
FIG. 9b is a polar grid geometry for implementing a metamaterial annular lens beamformer according to one example of the principles described herein.
Figure 9A:
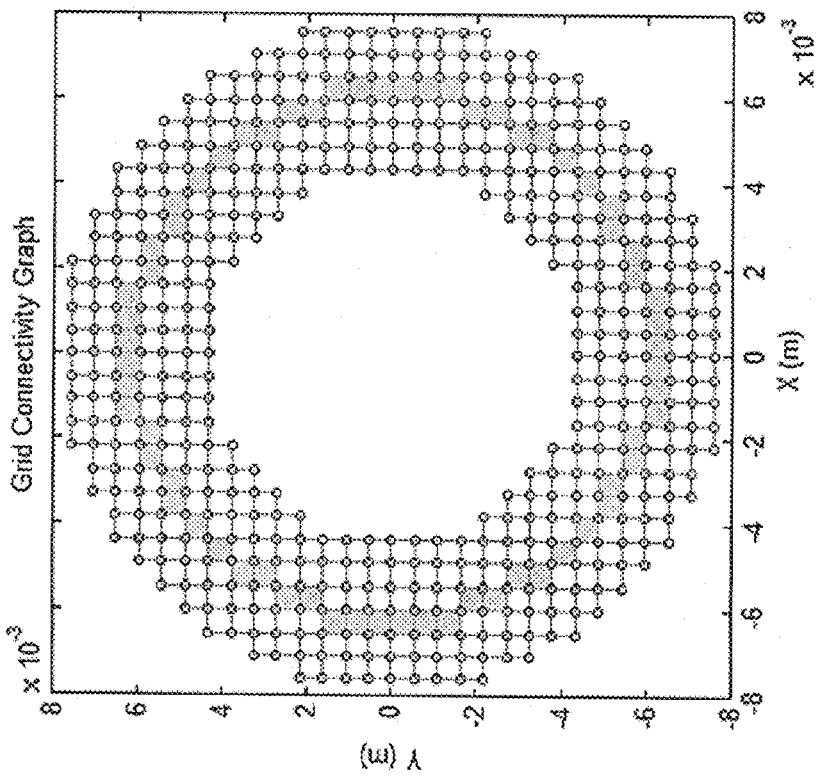
FIG. 9a is a square grid geometry for implementing a metamaterial annular lens beamformer according to one example of the principles described herein.
Figure 10:
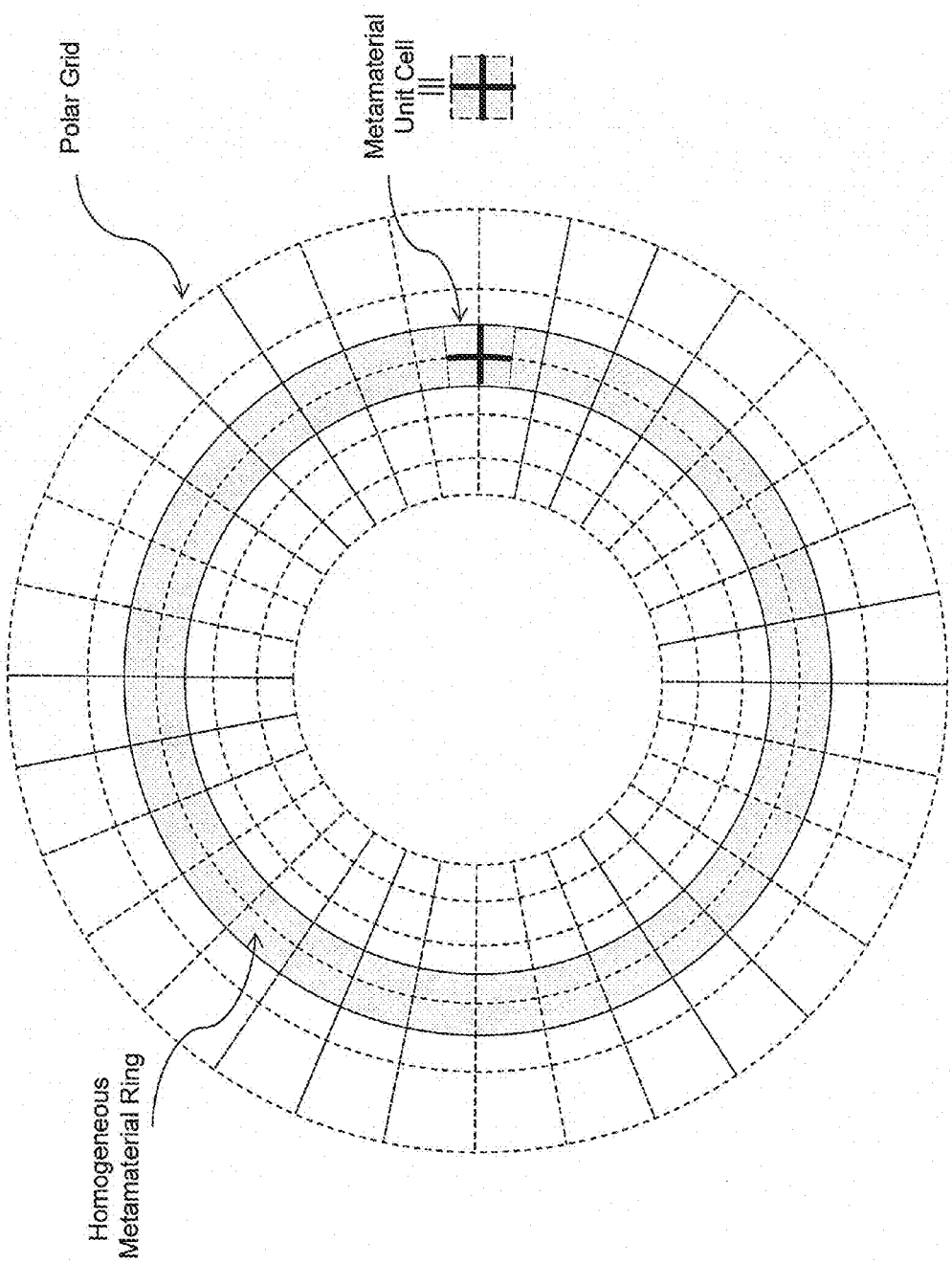
FIG. 10 depicts arrangement of the metamaterial unit cells and homogeneous metamaterial rings for an annular lens implemented in polar grid metamaterials according to one example of the principles described herein.

The above limitations can be overcome by using a polar grid, as shown in FIG. 9b. The advantage of the proposed polar grid topology is that it perfectly conforms to the contours of the ALBF, and clearly preserves the rotational symmetry. As shown in FIG. 10, if sectoral divisions are sufficiently small and the radial grid constant is scaled proportionally with r so that the grid pitch is nearly the same in the radial and azimuth directions, each cell in the polar grid can be approximated by a cell in an equivalent square lattice of the same dimensions. Thanks to this approximation, each ring in the polar grid metamaterial can be designed exactly in the same manner as a regular lattice with similar grid constant. The values of the outer and inner radii and number of grid sectors in the $\phi$ direction are chosen based on the practical range of capacitance and inductance values available in the technology of choice as well as the self-resonance of the unloaded cell. These parameters are chosen such that the cell dimensions for outermost ring do not exceed one half of a guided wavelength (for the transmission lines that are used to construct the cells). Theoretically, the best result is obtained if the each ring of the polar grid metamaterial conforms with a layer of the optically designed annular lens. Therefore, the task of ALBF design may start from choosing the parameters of the polar grid and using the resulting values of cell radii to discretize r for the purpose of designing the optical lens.

It must be understood that a metamaterial formulation and design approach is only one way of deriving a circuit implementation for the ALBF. Once the circuit topology of the lens and unit cells has been determined according to the principles described herein, it is easy for a person with ordinary skills in the art to devise other direct circuit synthesis methods or optimization techniques to determine the values of inductance, capacitors and transmission line components used to construct the lens.

An observation is that neither the optical design of the annular lens nor the metamaterial design of the ALBF electrical network presented above consider the effects of impedance mismatch between the lens layers. Also, the effects of reflection from the outer boundaries of the ALBF or the beam ports and array ports are not included in the design process. These effects can be addressed a posteriori by adding properly designed matching networks to the beam ports and array ports.

Figure 11B:
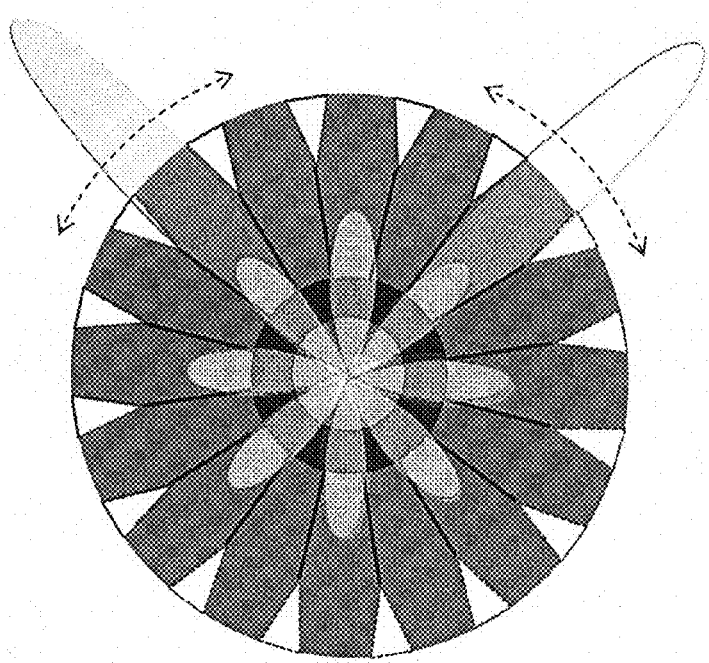
FIG. 11b is a diagram depicting a multi-beam electronically steerable antenna configuration based on an annular lens beamformer according to one example of the principles described herein.
Figure 11A:
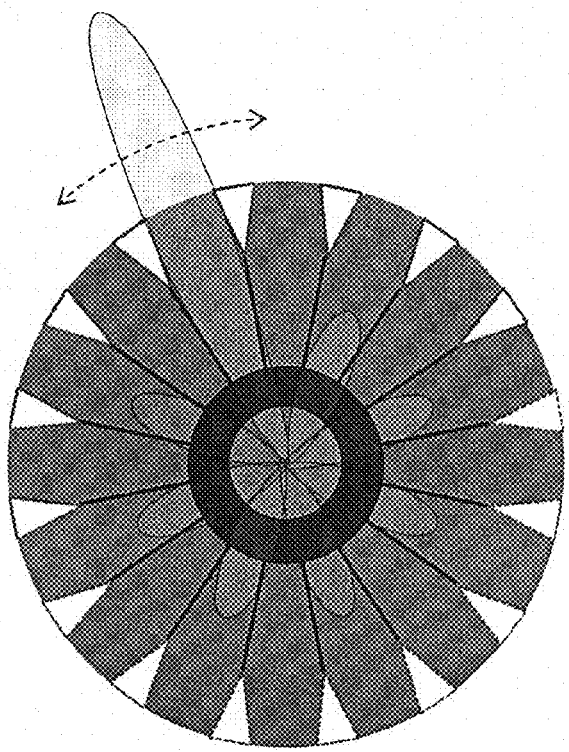
FIG. 11a is a diagram depicting a single beam electronically steerable antenna configuration based on an annular lens beamformer according to one example of the principles described herein.
Figure 11D:
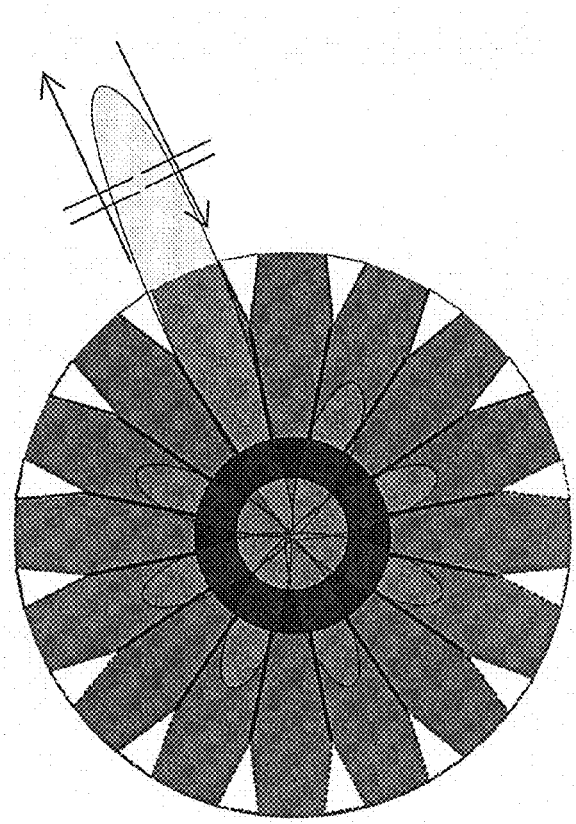
FIG. 11d is a diagram depicting a retro-directive array configuration based on an annular lens beamformer according to one example of the principles described herein.
Figure 11C:
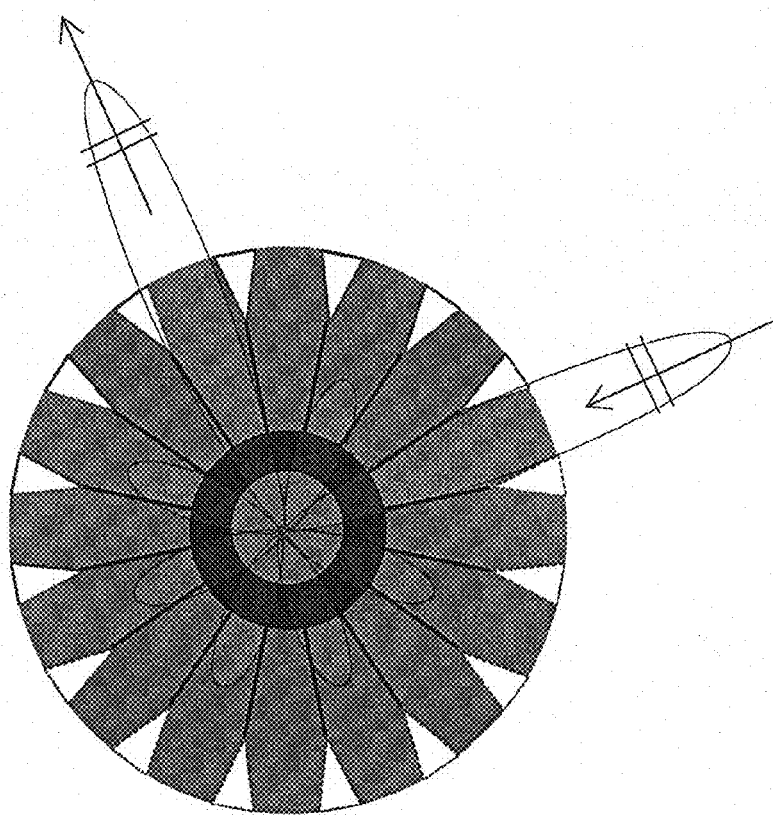
FIG. 11c is a diagram depicting a radio relay antenna configuration based on an annular lens beamformer according to one example of the principles described herein.

The application of the proposed annular lens beamformer devices is not limited to single beam electronically steerable antennas. Some of the useful configurations are shown in FIGS. 11a through 11d. While the basic ESA configuration of FIG. 11a, is suitable for a mobile terminal communicating with a fixed base station or another mobile terminal, a configuration with multiple independently controlled beams such as that depicted in FIG. 11b can be ideal for a hub simultaneously communicating with two or more mobile users. The configuration of FIG. 11c depicts an ALBF based antenna operating as a relay station (repeater). Finally, the configuration as depicted in FIG. 11d is a retrodirective array and appropriate for communication between a mobile node and a remote interrogator.

Figure 12:
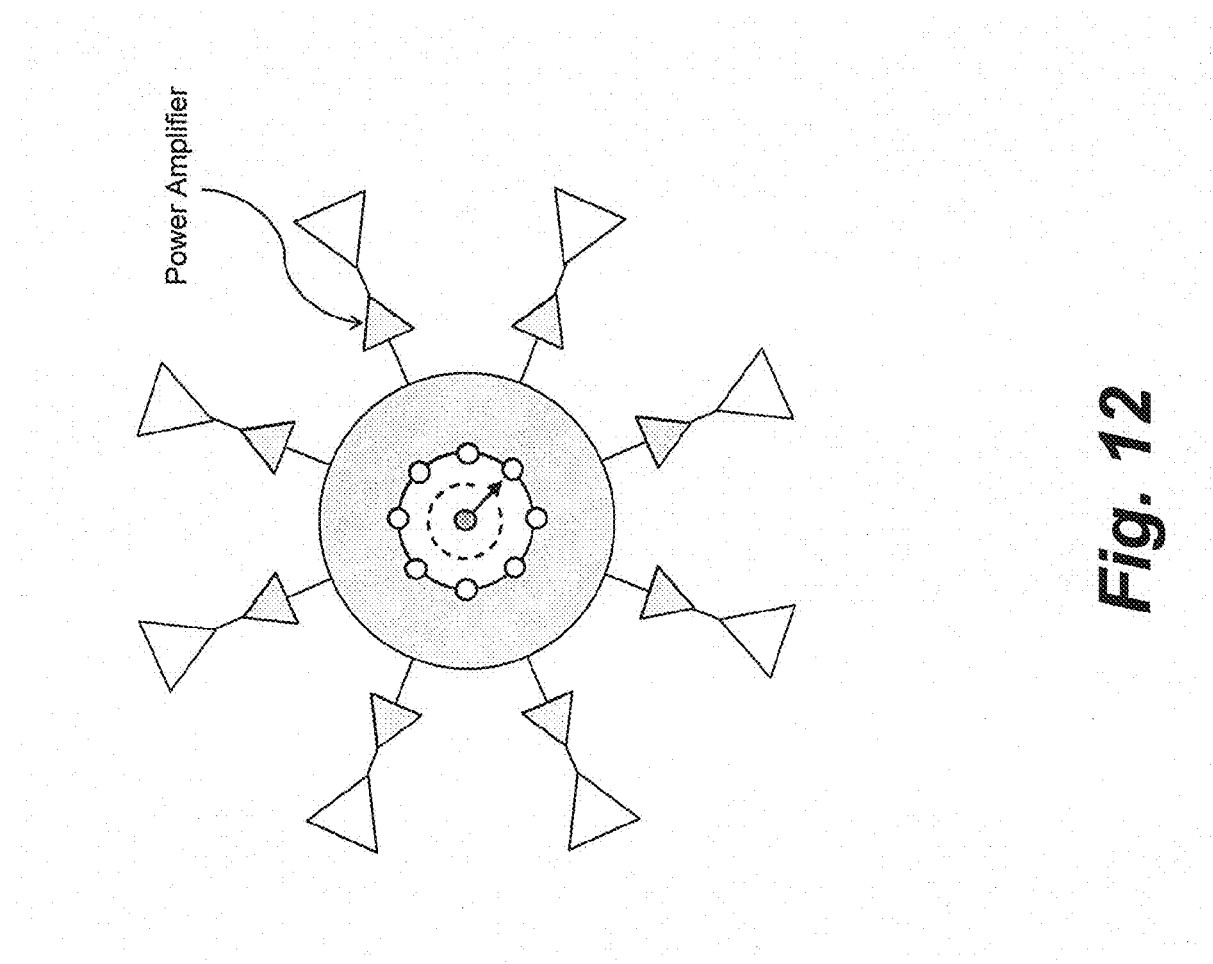
FIG. 12 is a diagram showing an electronically-steerable antenna which utilizes the annular lens beamformer described in this specification as for beamforming and power combining network. Power amplifiers are introduced between the beamformer array ports and antenna elements.

In high power applications, such as for cellular base stations, ALBF may also be integrated with power amplifiers to merge the functions of beamforming and power-combining in one device. An example of such a configuration is shown in FIG. 12, where power amplifiers are added between the array ports and the antenna elements.

The invention claimed is:

1. A beamforming apparatus comprising:
a plurality of $N_B$ beam ports arranged in a circular array, the circular array having a radius a;
an annular shaped lens encircling the plurality of $N_B$ beam ports, the annular shaped lens having an inner radius a, an outer radius b, and an inhomogeneous refractive index
n(r) where r is the distance from the lens geometrical axis of symmetry;
a plurality of $N_A$ array ports coupled to the outer rim of the annular shaped lens;
a plurality of $N_A$ equal-length transmission line segments each having a first end and a second end; and
a plurality of $N_A$ radiating elements;
in which:
a. the plurality of $N_B$ beam ports are equally spaced along the internal rim of the lens;
b. the plurality of $N_A$ array ports are equally spaced along the external rim of the lens;
c. the plurality of $N_A$ radiating elements are arranged such that their phase centers form are positioned at equal intervals along a complete circle having a radius c, and are labeled from 1 through $N_A$ in a clockwise or counter-clockwise order;
d. the annular shaped lens is situated on the z=0 plane of a cylindrical coordinate system CS(r,φ,z) such that its geometrical axis of symmetry aligns with the z axis, and a first beam port of the number of beam ports $N_B$ is positioned at the coordinates (r,φ,z)=(a, 0, 0);
e. the members of the plurality of $N_B$ beam ports are labeled from 1 through $N_B$ so that the position of each member i of the plurality of $N_B$ beam ports in the coordinate system CS(r,φ,z) is defined by the coordinates (a, $\phi_i^B$, 0) in which $0 \leq \phi_i^B \leq 2\pi$ rad, and the angles $\{\phi_i^B\}_{i=1:N_B}$ form an ascending order: $\phi_1^B < \phi_2^B < \ldots < \phi_{N_B}^B$;
f. the members of the plurality of $N_A$ array ports are labeled from 1 through $N_A$ so that the position of each member i of the plurality of $N_A$ array ports in the coordinate system CS(r,φ,z) is defined by (b, $\phi_i^A$, 0) in which $0 \leq \phi_i^A \leq 2\pi$ rad, and angles $\{\phi_i^A\}_{i=1:N_A}$ form an ascending order: $\phi_1^A < \phi_2^A < \ldots < \phi_{N_A}^A$;
g. the plurality of $N_A$ array ports are positioned symmetrically with respect to the φ=0 plane of the coordinate system CS(r,φ,z);
h. the members of the plurality of $N_A$ equal-length transmission line segments are labeled from 1 through $N_A$;
i. a first end of each member i of the plurality of $N_A$ equal-length transmission line segments is connected to the member i of the plurality of $N_A$ antenna ports;
j. a second end of each member i of the plurality of $N_A$ equal-length transmission line segments is connected to the member i of the plurality of $N_A$ radiating elements;
k. the refractive index for the material making the annular lens at any point (r,φ,z) is given by a real valued function n(r), where n(r) is chosen such that the optical path lengths for a number of $N_1$ rays, each:
emanating from the beam port 1 of the plurality of $N_B$ beam ports, propagating through the annular lens structure,
passing through an array port i of the plurality of $N_A$ array ports fulfilling the condition $\cos \phi_i^A > 0$,
propagating through a transmission line segment i of the plurality of $N_A$ equal-length transmission line segments,
propagating through a radiating elements i of the plurality of $N_A$ radiating elements,
propagating through the medium surrounding the radiating elements, to some infinitely distant point with r=∞,
are equal within a small fraction of the free space wavelength at the frequency of operation.

2. The apparatus of claim 1, in which the annular shaped lens comprises a plurality of M concentric rings of materials, labeled from 1 through M from the inner most ring to the outer most ring, so that the refractive index of each ring m is given by a single real constant $n_m$.

3. The apparatus of claim 2, in which:
the refractive indexes $n_1$ through $n_M$ of the plurality of M concentric rings satisfy the following system of equations or an approximation thereof:

$$\varphi_i = \sum_{m=1}^{M} \left[ \sin^{-1}\left(-\frac{n_0}{n_m}\frac{c}{r_m}\sin\varphi_i\right) - \sin^{-1}\left(-\frac{n_0}{n_m}\frac{c}{r_{m+1}}\sin\varphi_i\right) \right]; i = 1, \ldots, M$$

in which:
a. $n_0$ is the refractive index of the propagation medium surrounding the radiating elements;
b. $r_1$ through $r_M$ are the inner radii of the concentric rings 1 through M;
c. $r_2$ through $r_{M+1}$ are the outer radii of the concentric rings 1 through M; and
d. $\phi_1, \phi_2, \ldots, \phi_M$ are M distinct arbitrary values in the range of $(0, \pi/2)$.

4. The apparatus of claim 3, in which $\phi_1, \phi_2, \ldots, \phi_M$ are chosen as $\phi_1^A, \phi_2^A, \ldots, \phi_M^A$.

5. The apparatus of claim 2, in which the refractive indexes $n_1$ through $n_M$ are found from maximizing the following array factor or any equivalent thereof:

$$|AF| = \left| \sum_i \exp\left[ -jk_0 \sum_{m=1}^{M} \left\{ \frac{n_m^2 r_m r_{m+1}}{n_0 c \sin\varphi_i^A} \sin\left[ \sin^{-1}\left(\frac{n_0 c}{n_m r_m}\sin\varphi_i^A\right) - \sin^{-1}\left(\frac{n_0 c}{n_m r_{m+1}}\sin\varphi_i^A\right) \right] \right\} + jk_0 n_0 d \cos\varphi_i^A \right] \right|$$

in which:
a. $j = \sqrt{-1}$;
b. $k_0$ is the free space wave number at the design frequency;
c. $n_0$ is the refractive index of the medium surrounding the radiating elements;
d. $r_1$ through $r_M$ are the inner radii of the concentric rings 1 through M;
e. $r_2$ through $r_{M+1}$ are the outer radii of the concentric rings 1 through M;
f. d is a real number satisfying the condition $-c \leq d \leq c$; and
g. the outer summation is over all or a subset of the array ports which fulfill the condition $\cos \phi_i^A > 0$.

6. The apparatus of claim 2, in which the annular lens comprises a plurality of M homogeneous metamaterial rings, in which:
   a. each metamaterial ring m of the plurality of M homogeneous metamaterial rings is constructed by connecting a number of identical two-dimensional metamaterial unit cells; in which
      each metamaterial unit cell is a small electrical network comprising capacitors, inductors, transmission line segments, and a plurality of, for example 3, 4, or 6, terminals all or some of which are used to connect the said metamaterial unit cell to the neighboring metamaterial unit cells;
   b. each ring m of the plurality of M homogeneous metamaterial rings having a positive index of refraction $n_m > 0$ comprises metamaterial unit cells having positive propagation constants at the frequency of operation for all principal directions when connected in a two-dimensional periodic lattice environment,
   c. each ring m' of the plurality of M homogeneous metamaterial rings having a negative index of refraction $n_{m'} < 0$ comprises metamaterial unit cells having negative propagation constants at the frequency of operation for all principal directions when connected in a two-dimensional periodic lattice environment; and
   d. each ring m" of the number M of homogeneous metamaterial rings having a zero index of refraction of $n_{m''} = 0$ comprises metamaterial unit cells having zero propagation constants at the frequency of operation for all principal directions when connected in a two-dimensional periodic lattice environment.

7. The apparatus of claim 6, in which the annular shaped lens is implemented using polar grid metamaterials, in which:
   a plurality of P×Q grid points are found by intersecting a first set of P concentric circles and a second set of Q equally spaced radial lines;
   each metamaterial unit cell is centered at one of the plurality P×Q of grid points;
   metamaterial unit cells centered on each circle of the set of P concentric circles are identical to each other and form a homogeneous metamaterial ring; and
   the unit cells lying on different circles generally differ in size, component values, and refractive index or some of these properties.

8. The apparatus of claim 7, in which:
   P is greater or equal to the number of homogeneous metamaterial rings M;
   Q is an integer multiple of both $N_A$ and $N_B$;
   each of the plurality of M homogeneous metamaterial rings is implemented using a one or an integer number of the concentric metamaterial rings;
   the plurality of $N_B$ beam ports are implemented by periodically tapping into the inner most metamaterial ring by making parallel or series connections with or otherwise coupling to the nodes or branches of the inner most metamaterial ring; and
   the plurality of $N_A$ array ports are implemented by periodically tapping into the outer most metamaterial ring by making parallel or series connections with or otherwise coupling to the nodes or branches of the outer most metamaterial ring.

9. The apparatus of claim 8, in which:
   the separation between successive circles of the set of P concentric circles and the width of the metamaterial rings grows proportionally with their radius;
   at any given radius the separation between successive circle of the set of P concentric circles is nearly equal to the separation between adjacent radial grid line of the set of Q radial lines;
   the length of each metamaterial unit cell, as measured along the radial direction, is nearly equal to its average width, as measured along the azimuth direction; and
   the effective properties of each unit cell can be approximated by those of a metamaterial unit cell connected in a regular square grid lattice with similar cell length.

10. The apparatus of claim 8, in which:
    the separation between successive circles of the set of P concentric circles and the width of the metamaterial rings are chosen arbitrarily;
    the length of each metamaterial unit cell, as measured along the radial direction, may be smaller or greater than its average width, as measured along the azimuth direction; and
    the effective properties of each unit cell can be approximated by those of a metamaterial unit cell implemented in a regular rectangular grid with similar cell length and similar cell width.

11. The apparatus of claim 2, in which:
    a. the annular lens is modified as follows:
       for an integer number $m_G$ in the range $1 \leq m_G < M-1$, each of the concentric rings 1 through $m_G$ of the M concentric rings are scaled by a scaling factor $0 < \alpha < 1$ so that:
          the inner and the outer radii of the concentric ring are multiplied by the scaling factor $\alpha$,
          the refractive index of the material making the concentric ring is multiplied by the inverse of the scaling factor $1/\alpha$;
    b. A first plurality of $N_G$ gap terminals are added at equal intervals on the outer rim of the concentric ring $m_G$ of the plurality of M concentric rings and are labeled from 1 through $N_G$ in a counter-clockwise order,
    c. A second plurality of $N_G$ gap terminals are added at equal intervals on the inner rim of the concentric ring $m_G+1$ of the number M concentric rings and are labeled from 1 through $N_G$ in a counter-clockwise order,
    d. A plurality of $N_G$ identical amplifiers each having a first and a second terminal are labeled from 1 through $N_G$ and are connected between the plurality of $N_G$ first gap terminals the plurality of $N_G$ second gap terminals, so that:
       the first terminal of each amplifier l of the plurality of $N_G$ identical amplifiers is connected to terminal l of the first plurality of $N_G$ gap terminals, and
       the second terminal of each amplifier l of the plurality of $N_G$ identical amplifiers is connected to the terminal l of the second plurality of $N_G$ gap terminals.

12. The apparatus of claim 1, in which each radiating element of the plurality of $N_A$ radiating elements is a small electrical probe radiating electromagnetic energy into a two-dimensional propagation medium such as a dielectric slab waveguide or a two-dimensional metamaterial structure.

13. The apparatus of claim 1, in which the annular lens is implemented as an electrical network of interconnected filters, in which:
    a. each filter or small cluster of connected filters replaces a small portion of the lens material;
    b. each filter is a constructed as a small electrical network of capacitors, inductors, transmission line segments, or other electrical components;
    c. each filter replacing a portion of the lens material having a positive index of refraction or being a part of a cluster of filters that replaces a portion of the lens material having a positive index of refraction has a low-pass or band-pass frequency response.
   d. each filter replacing a portion of the lens material having a zero or negative index of refraction or being a part of a cluster of filters that replaces a portion of the lens material having a zero or negative index of refraction has a band-pass frequency response.

14. The apparatus of claim 1, in which impedance matching networks are added to the plurality of $N_B$ beam ports and the plurality of $N_A$ array ports.

15. The apparatus of claim 1 in which a plurality of $N_A$ amplifiers are added in between each array port of the plurality of $N_A$ of array ports and a radiating element of the plurality of $N_A$ radiating elements.

16. The apparatus of claim 1 in which
   a plurality of amplifiers are inserted in between a pair of successive concentric rings $m_G$ and $m_{G+}1$ of the plurality of M concentric rings of materials.

* * * * *